US011163515B2

(12) United States Patent
Kruse et al.

(10) Patent No.: US 11,163,515 B2
(45) Date of Patent: Nov. 2, 2021

(54) CONTROLLER REDUNDANCY FOR A DISPLAY SYSTEM

(71) Applicant: Daktronics, Inc., Brookings, SD (US)

(72) Inventors: Denver Wayne Kruse, Bruce, SD (US); Stephen Nathaniel Bostrom, Hartford, SD (US); Aaron Milbrath, Sioux Falls, SD (US); Scott Donelan, Brookings, SD (US); James Noble, Aurora, SD (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 16/500,363

(22) PCT Filed: Apr. 2, 2018

(86) PCT No.: PCT/US2018/025707
§ 371 (c)(1),
(2) Date: Oct. 2, 2019

(87) PCT Pub. No.: WO2018/187221
PCT Pub. Date: Oct. 11, 2018

(65) Prior Publication Data
US 2020/0183634 A1      Jun. 11, 2020

Related U.S. Application Data

(60) Provisional application No. 62/480,853, filed on Apr. 3, 2017.

(51) Int. Cl.
*G06F 3/14*      (2006.01)
*G09G 3/32*      (2016.01)

(52) U.S. Cl.
CPC .......... *G06F 3/1438* (2013.01); *G06F 3/1446* (2013.01); *G09G 3/32* (2013.01);
(Continued)

(58) Field of Classification Search
CPC ....... G06F 3/1438; G06F 3/1446; G09G 3/32; G09G 2300/026; G09G 2330/08;
(Continued)

(56) References Cited

U.S. PATENT DOCUMENTS 8,301,939 B2      10/2012   Gloege et al.
2008/0104871 A1*   5/2008   Stadjuhar ......... G08G 1/096783
                                                      40/584

(Continued)

FOREIGN PATENT DOCUMENTS

WO      WO-2018187221 A1    10/2018

OTHER PUBLICATIONS

"International Application Serial No. PCT/US2018/025707, International Search Report dated Jun. 18, 2018", 4 pgs.
(Continued)

*Primary Examiner* — Kenneth Bukowski
(74) *Attorney, Agent, or Firm* — Schwegman Lundberg & Woessner, P.A.

(57) ABSTRACT

A display system comprises a plurality of displays each comprising an array of light-emitting elements to display a corresponding message, a primary controller that controls the array of light-emitting elements of each display to control the content of each message, a communication network to transmit control signals from the primary controller to the displays, a remote manager in communication with the primary controller via a primary manager communication link, and a redundant controller configured and able to control the array of light-emitting elements of each display to control the content of each message if it is determined that there is a malfunction of the primary controller, an interruption in the communication network (Continued)

between the primary controller and at least one of the displays, or an interruption in the primary communication link.

19 Claims, 5 Drawing Sheets

(52) U.S. Cl.
CPC ... *G09G 2300/026* (2013.01); *G09G 2330/08* (2013.01); *G09G 2330/12* (2013.01); *G09G 2370/022* (2013.01); *G09G 2380/06* (2013.01)

(58) Field of Classification Search
CPC ......... G09G 2330/12; G09G 2370/022; G09G 2380/06; G08G 1/095
See application file for complete search history.

(56) References Cited

U.S. PATENT DOCUMENTS

| | | | |
|---|---|---|---|
| 2009/0024867 A1* | 1/2009 | Gloege | G06F 11/2007 714/3 |
| 2012/0319926 A1 | 12/2012 | Koebrich et al. | |
| 2016/0162247 A1* | 6/2016 | Bryczkowski | G06F 11/162 345/1.3 |

OTHER PUBLICATIONS

"International Application Serial No. PCT/US2018/025707, Written Opinion dated Jun. 18, 2018", 8 pgs.

"Australian Application Serial No. 2018248769, First Examination Report dated Jun. 17, 2020", 5 pgs.

"Australian Application Serial No. 2018248769, Response filed Oct. 15, 2020 to First Examination Report dated Jun. 17, 2020", 16 pgs.

"European Application Serial No. 18719024.4, Response filed May 13, 2020 to Communication pursuant to Rules 161(1) and 162 EPC dated Nov. 14, 2019", 21 pgs.

"International Application Serial No. PCT/US2018/025707, International Preliminary Report on Patentability dated Oct. 17, 2019", 10 pgs.

"European Application Serial No. 18719024.4, Communication Pursuant to Article 94(3) EPC dated Sep. 8, 2021", 7 pgs.

* cited by examiner

CONTROLLER REDUNDANCY FOR A DISPLAY SYSTEM

CLAIM OF PRIORITY

This application is a U.S. National Stage Filing under 35 U.S.C. § 371 from International Application No. PCT/US2018/025707, filed on Apr. 2, 2018, and published as WO 2018/187221 on Oct. 11, 2018, which application claims the benefit of priority of U.S. Provisional Application Serial No. 62/480,853, filed Apr. 3, 2017, which applications are incorporated by reference herein in their entireties.

BACKGROUND

Displays comprising a plurality of light-emitting elements (such as light-emitting diodes, or LEDs) are used for the display of information. For example, dynamic message displays can comprise an array of light-emitting elements configured to display information. In some examples, individual displays are formed from a plurality of smaller display modules that are operated together to form a larger display.

SUMMARY

The present disclosure describes a display system with a primary display controller configured to control more than one display, and in some examples up to eight displays. The system also includes a redundancy display controller that can take over for the primary controller if a failure in communication between the primary controller and one or more of the displays is detected

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Figure 1:
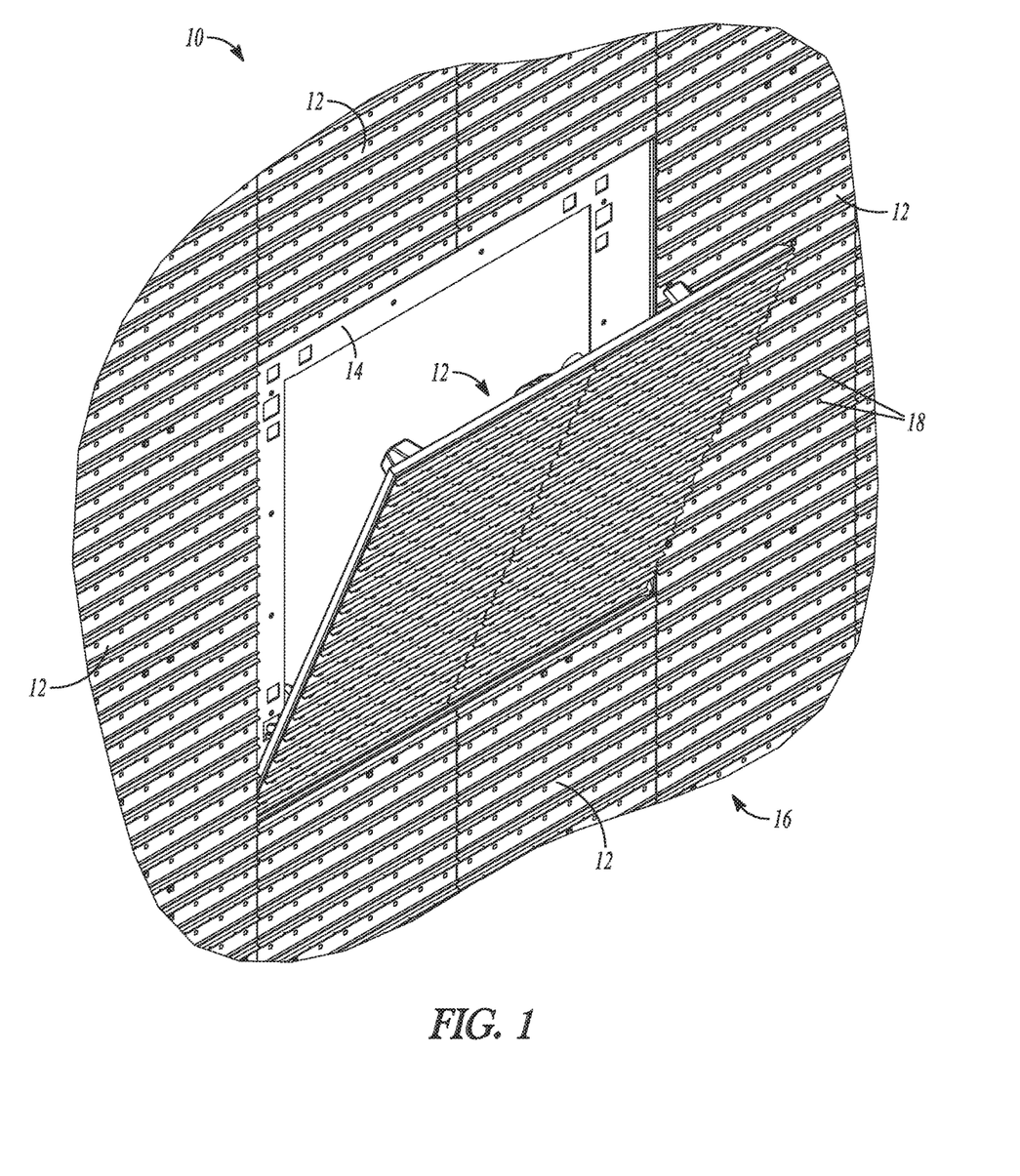
FIG. 1 is a partial perspective view of an example display comprising a plurality of individual display modules that are operated in a cooperative manner to display information on the light-emitting display.

FIG. 1 shows an example of an information display 10 (also referred to simply as "display 10") that is configured to display one or more of video, graphical, or textual information. The display 10 includes a plurality of individual display modules 12 mounted to a support structure 14. The plurality of display modules 12 are operable together so that the overall display 10 appears as a single, larger display. FIG. 1 shows one of the display modules 12 being in a tilted position relative to the support structure 14, which can occur when that display module 12 is in the process of being mounted to, or dismounted from, the support structure 14. The other display modules 12 in the display 10 are mounted to the support structure 14.

The display 10 can include a display surface 16 configured to display the video, graphical, or textual information from the display 10. A plurality of light-emitting elements 18 are mounted to the display surface 16. The light-emitting elements 18 are operated together to display the video, graphical, or textual information on the display 10. The light-emitting elements 18 can be any type of light-emitting technology known or yet to be discovered for the emission of light from a small area, particularly for light-emitting technology that is or can be used display of visual information, such as video, graphical, or textual information. At the time of filing of the present application, light-emitting diodes (LEDs) are one of the most common light-emitting technologies in use for video or graphical displays of the type described herein. As such, for the sake of brevity, the light-emitting elements 18 will be referred to as LEDs 18 throughout the present disclosure. However, it will be understood that any time the following description uses the term "light-emitting diode" or "LED," that light-emitting devices other than LEDs can be used, including, but not limited to, liquid crystal display devices (LCDs), organic light-emitting diodes (OLEDs), organic light-emitting transistors (OLETs), surface-conduction electron-emitter display devices (SEDs), field-emission display devices (FEDs), laser TV quantum dot liquid crystal display devices (QD-LCDs), quantum dot light-emitting diode display devices (QD-LEDs), ferro-liquid display devices (FLDs), and thick-film dielectric electroluminescent devices (TDELs).

Figure 2:
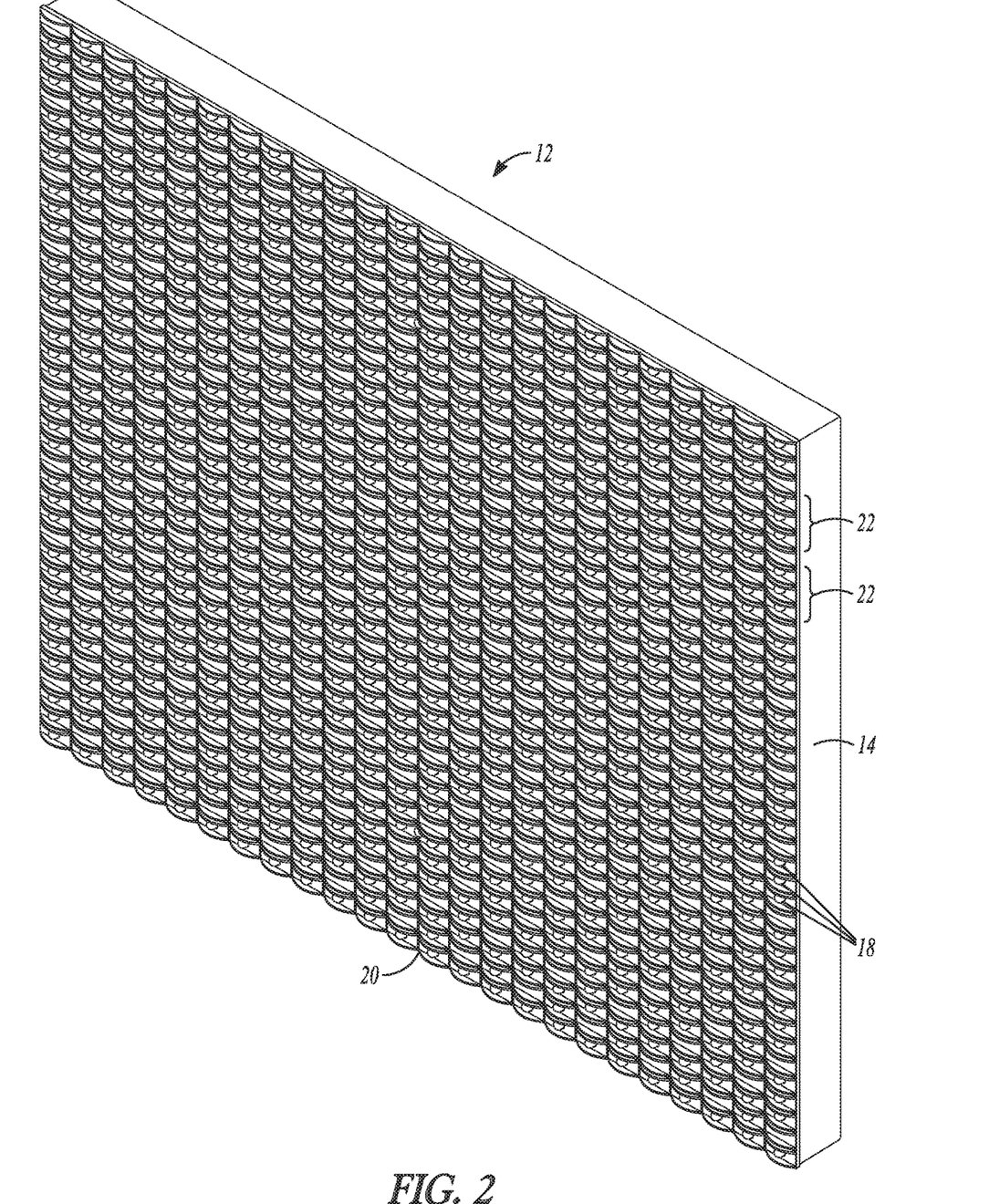
FIG. 2 is a perspective view of an example display module, which can be used as one of the individual display modules in the example display of FIG. 1.

FIG. 2 is a perspective view of an example display module 12 that can be used in the display 10 of FIG. 1. The display module 12 includes a face 20 configured to provide for a display of graphics or video content. A plurality of the LEDs 18 are positioned on the face 20 and the LEDs 18 can be operated in such a way that the display module 12 will display a portion of the video, graphical, or textual information to be shown on the display 10. The face 20 of the display module 12 is aligned and oriented relative to faces 20 of one or more adjacently-positioned LED modules 12 so that the faces 20 combine to form the display surface 16 of the overall display 10 shown in FIG. 1. The plurality of display modules 12 are operated together in such a way as to display the video, graphical, or textual information in a cohesive manner so that the entire display 10 appears to a viewer as a single display that is larger than the individual display modules 12.

In an example, the LEDs 18 are arranged into an array of pixels 22 (best seen in FIG. 2). Each pixel 22 includes one or more LEDs 18 grouped together in close proximity. The proximity of the pixels 22 allows the display 10 to be operated in such a way that they will appear to a viewer of the display 10 to form recognizable shapes, such as letters or numbers to display textual information or recognizable shapes to display graphical or video information. In some examples, the plurality of LEDs 18 include a plurality of different-colored LEDs 18 such that different-colored LEDs 18 of each pixel 22 can be cooperatively operated to display what appears to be a spectrum of different colors for the viewer of the display 10. In an example, each pixel 22 includes a red LED 18, a green LED 18, and a blue LED 18, wherein the red, green, and blue LEDs of each pixel 22 cooperate to provide essentially the entire color spectrum that is visible to humans based on whether one, two, or al three of the LEDs 18 in a pixel 22 are it, and at what intensities. The display 10 can also provide a black or empty looking surface over a portion of the display, when desired, by deactivating or turning off the LEDs in a designated area of pixels 22.

In an example, the pixels 22 are arranged in a grid-like array, such as a grid comprising a specified number of rows and a specified number of columns of the pixels 22. The display 10 can be controlled, for example with control software and/or one or more hardware controllers, so that visual information, e.g., video, graphical, or textual information, is broken down into coordinates. Each coordinate can correspond to a specific pixel location within the overall display 10, and the control software and/or the one or more hardware controllers can operate each pixel according to a program that specifies a condition for each coordinate within the display 10 and controls each of the pixels 22 so that it will appear to emit light that meets the condition specified. For example, if the display 10 is displaying a series of textual messages, the control software and/or the one or more hardware controllers can be fed the data corresponding to the series of textual messages, and the control software and/or the one or more hardware controllers can break the text of the messages down into conditions for each pixel 22, such as the time within the series of messages, the color that a pixel 22 is to display at that time (if the display 10 is a multi-colored display) and the intensity of the pixel 22 at that time. The control software and/or the one or more hardware controllers can also convert the information regarding color and intensity into specific operating parameters for each LED 18 in a particular pixel 22, such as the power that will be supplied to the red LED 18, the blue LED 18, and the green LED 18 in that pixel 22 and for how long in order to achieve the specified color and intensity at the specified time. The control software and/or the one or more hardware controllers can then send control signals to the pixels 22 or to individual LEDs 18 that can operate the pixels 22 according to the specified series of textual messages. Although a grid or grid-like array of LED pixels, as summarized above, is common, the display 10 described herein can use other arrangements of the LEDs 18 or other systems for addressing the LEDs 18 can be used without varying from the scope of the present invention.

Figure 3:
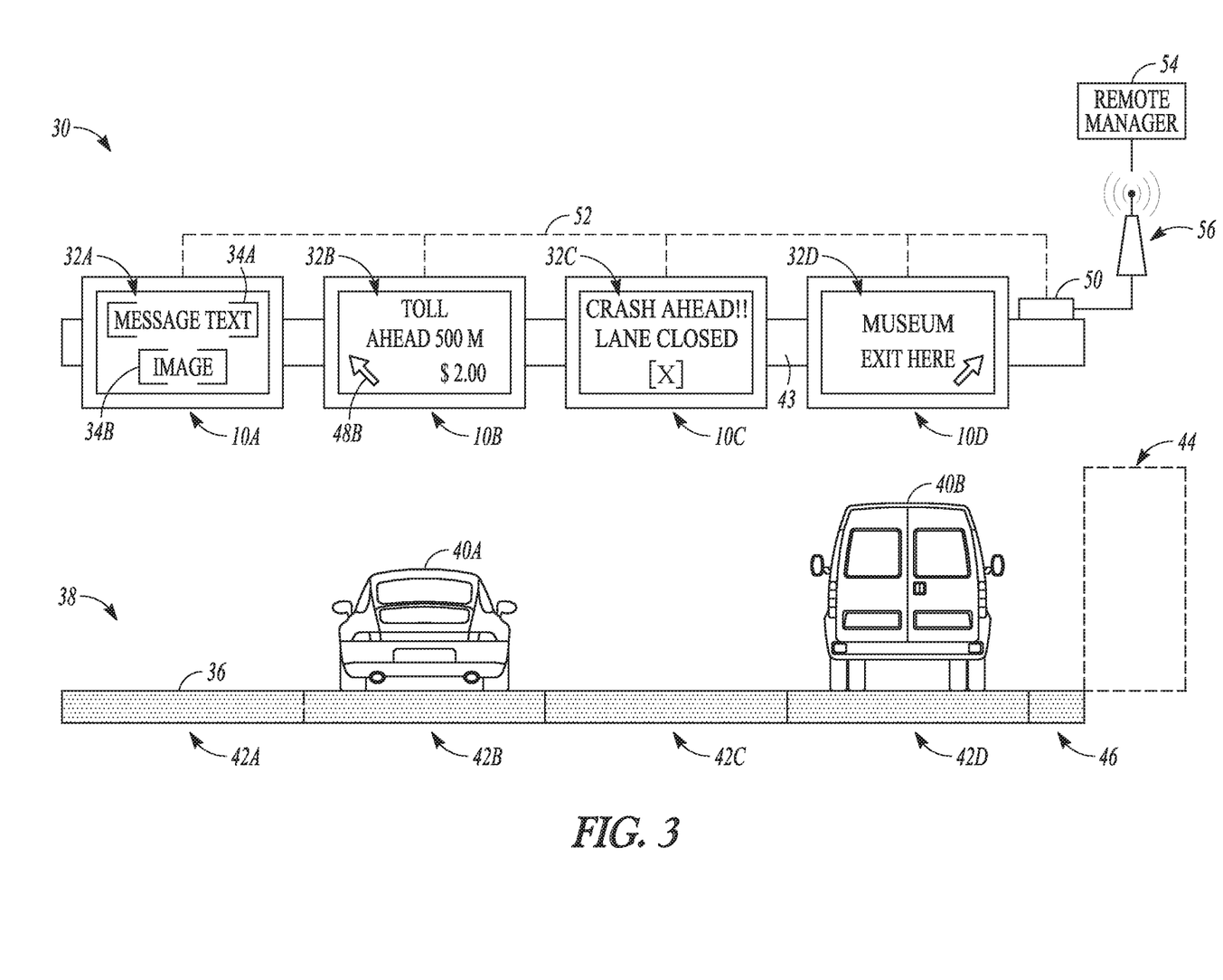
FIG. 3 is a plan view of an example multi-display system comprising a plurality of transportation displays.

FIG. 3 shows an example of a system 30 comprising a plurality of displays 10A, 10B, 10C, 10D. For this reason, the system 30 may also be referred to as a multi-display system 30. Each of the displays 10A, 10B, 10C, and 10D in FIG. 3 can be similar to the example display 10 described above with respect to FIG. 1. For this reason, unless there is a reason to refer to a specific display, the displays 10A, 10B, 10C, and 10D will be referred to collectively as "display 10" or "displays 10."

In an example, one or more of the displays 10 in the system 30 can be formed from a plurality of display modules (which can be similar or substantially identical to the display modules 12 described with respect to FIG. 2). The display modules of each display 10 are mounted to a support structure, such as a support chassis, in a cooperative relative arrangement so that the front faces of the display modules come together to form a display surface 16, similar or substantially identical to how the faces 20 of the display modules 12 are arranged in a proximate and aligned manner relative to one another to provide the display surface 16.

The system 30 is configured to display corresponding messages 32 on one or more of the displays 10A, 10B, 10C, 10D, such as a first message 32A on the first display 10A, a second message 32B on a second display 10B, a third message 32C on a third display 10C, a fourth message 32D on a fourth display 10D, and so on. In an example, the system 30 can be capable of displaying messages 32 that include one or both of a textual component 34A (shown conceptually as "[MESSAGE TEXT]" in message 32A in FIG. 3) and a graphical or video component 34B (shown conceptually as "" in FIG. 3). The message text 34A and the message image or video 34B components of a message 32 will be referred to as "message content 34" or simply "content 34" for brevity.

In an example, shown in FIG. 3, the system 30 and the displays 10 are configured as digital roadway signs that are positioned within a reasonable distance from a driving surface 36 of a roadway 38. In such an example, the system 30 and the displays 10 can be configured so that the message content 34 on the displays 10 include or relate to transportation information to drivers or passengers in one or more automobiles that are driving on the driving surface 36 of the roadway 38, such as a car 40A and a van 40B (collectively "automobile 40" or "automobiles 40"). For this reason, the displays 10 in FIG. 3 may also be referred to as "signs 10," "road signs 10," "transportation signs 10," or "transportation displays 10" and the system 30 may also be referred to as a "transportation display system 30" or a "transportation information system 30."

Examples of transportation information that can be part of the message content 34 on the displays 10 include, but are not limited to: traffic conditions on the roadway 38 or on other roadways near the roadway 38 that might be relevant to those in the drivers or passengers in the automobiles 40; Information on an upcoming hazard on the roadway 38 or on other nearby roadways (such as an accident or an external object or structure, such as a downed tree or power line, impeding traffic flow); weather conditions in a relevant vicinity are the roadway 38; toll information (such as the price for an upcoming or ongoing toll, or the location of an upcoming toll collection); travel time for the roadway 38 or a common route that the roadway 38 is on (such as a travel time estimate from the location of the system 30 to a common destination, such as a metropolitan city center or a landmark or attraction of interest); exit information (such as upcoming cross streets or exits along the roadway 38); amber alert information in the are of the roadway 38; accident information for congestion control; information relating to nearby transit (such as the location of a train, bus, or other transit station, or upcoming departure times for transit options near the system 30). The information provided on the displays 10 are not limited to the types described above, but rather could also include any information that night be relevant or of interest to those in the automobiles 40, which can include information that might be specific or specialized for the area (e.g., city, county, state, or region of the roadway 38), or can include the types of information that are typically communicated to transportation information systems, like the example system 30 of FIG. 3, via signals transmitted from an external source according to the National Transportation Communication for ITS (Intelligent Transportation Systems] Protocol (NTCIP) standard, which provides regulations for standardized communications to devices used in transportation systems.

In the example shown in FIG. 3, the roadway 38 is a highway, such as an interstate or other high-capacity roadway, that comprises a plurality of separate lanes 42 for the automobiles 40 to drive in, which may also be referred to as the highway 38. The roadway 38 shown in the example of FIG. 3 is a four-lane highway 38 that includes (from left to right when facing the direction of traffic) a first lane 42A, a second lane 42B, a third lane 42C, and a fourth lane 42D. The first lane 42A is the left-most lane and is typically where automobiles 40 that are driving the fastest will drive or where a motorist will drive to pass another slower-moving automobile 40, so that it is often referred to colloquially as the "fast lane 42A" or the "passing lane 42A." The fourth lane 42D is the right-most lane and is typically used by slower-moving vehicles or those that are about to exit the highway 38 (such as onto an exit ramp), so that it is often referred to colloquially as the "slow lane 42D" or the "exit lane 42D." The second and third lanes 42B and 42C are between the fast lane 42A and the slow lane 42D, and therefore will also be referred to as the interior lanes 42B and 42C. Those of skill in the art will appreciate that the descriptions of the lanes 42 provided above applies to countries where it is required or customary to drive on the right side of the road (when facing the direction of traffic), such as the United States of America or most of the countries in Europe. In countries where it is required or customary to drive on the left side (when facing the direction of traffic), such as the United Kingdom and many current and former British colonies, the lane descriptions can be reversed (i.e., with the first lane 42A being the slow or exit lane 42A and the fourth lane 42D being the fast or passing lane 42D).

In an example, the system 30 includes a separate dedicated transportation sign 10 over each of the lanes 42: i.e., the first sign 10A over the first lane 42A, the second sign 10B over the second lane 42B, the third sign 10C over the third lane 42C, and the fourth sign 10D over the fourth lane 42D, with each sign 10 being mounted to a support structure such as a support beam 43. This type of multi-sign system 30 can provide the ability to display message content 34 to drivers in each lane 42 without the driver having to look all the way over to the roadside such as the area conceptually represented by box 44 located off a right shoulder 46 of the roadway 38. This can allow drivers in each lane 42 to be more focused on the roadway 38 in front of their automobile 40, rather than having to take his or her attention away from the front of the automobile 40 by looking across one or more lanes 42 of the roadway 38 in order to see and comprehend the message content 34.

The example shown in FIG. 3 with a dedicated sign 10 over each of two or more lanes 42 of the roadway 38 can also allow for message content 34 that is customized for a particular lane 42 rather than displaying the same information on a single sign. This can be helpful because in some situations the relevance of the message content 34 to a particular driver can depend on which lane 42 that driver's automobile 40 is in. This is demonstrated by the hypothetical example shown in FIG. 3, wherein perhaps the roadway 38 is coming up to a split where the two left-most lane 42A and 42B may be splitting off from the two right-most lanes 42C and 42D (indicated by the arrow 48B in message 32B). Moreover, perhaps lanes 42A and 42B then feed into a tollway, such that the message 32B on the sign 10B over the second lane 42B notifies the driver of the car 40A in lane 42B of the $2.00 toll (FIG. 3 does not show the message 32A of the first sign 10A as including an arrow 48 or the information about the toll because the message 32A is shown conceptually with generic message text content 34A and a generic message image or video 34B, as described above). Also, in the example shown, an accident has occurred up ahead that is blocking at least part of the third lane 42C so that the message 32C of sign 10C includes a warning of the "CRASH AHEAD!!" and a notification that the lane is closed. Finally, in the example shown, a place of interest such, as a local museum, is accessible at the next exit off the highway 38 such that the message 32D of the sign 10D over the exit lane 42D includes the arrow 48D and tells drivers to "EXIT HERE" if they want to get to the "MUSEUM."

As can be appreciated by this example, the message 32B of the second sign 10B is relevant to the driver of the car 40A in the second lane 42B so that the driver is informed about the splitting of the highway 38 and that a toll will be due, allowing the driver to either change lanes into the right-most lanes 42C and 42D to avoid splitting off (if that is undesired) or to get payment prepared for the toll. But, the information in the message 32B may not be relevant to the driver of the van 40B, who may not care what the toll is or even that there is a toll since he or she will not be encountering it. Similarly, the driver of the car 40A may have little interest in where the museum is located, and thus need not be bothered with the information that the museum's exit is imminent (although this information might be of great interest to the driver of the van 40B if he or she is driving a group of children to see the museum). The information about the accident in the message 32C of the sign 10C is mostly only relevant to drivers of automobiles 40 that are still in the third lane 42C, but the message 32C might also be relevant to a driver in either the second lane 42B or the fourth lane 42D that had been considering merging into the third lane 42C. However, the driver in the second or fourth lanes 42B or 42C would be likely to at least glance toward the third lane 42C and therefore is likely to notice the message 32C, particularly if it includes aspects that make it more conspicuous and apparent (such as the larger sized text, the exclamation points after "CRASH AHEAD!!" and the icon "[X]").

The system 30 also includes one or more controllers 50 that control the operation of the displays 10. The one or more controllers 50 communicate with one or more of the displays 10 in the system 30, such as via at least one display communication link 52, in order to control the displays 10. The display communication link 52 allows the one or more controllers 50 to transmit control signals to the displays 10 that correspond to the message 32 to be displayed on each of the displays 10 (e.g., the control signals can instruct a display 10 on which pixels 22 should be illuminated and, in some examples, with which color and at what intensity). The display communication link 52 also allows each display 10 to transmit diagnostic information back to the controller 50, which the controller 50 can use to gauge the health of each display 10.

In an example, each controller 50 is configured to communicate with and control at least two (2) displays 10 in the system 30. In an example, each controller 50 is configured to communicate with and control at least three (3) displays 10 in the system 30. In an example, each controller 50 is configured to communicate with and control at least four (4) displays 10 in the system 30. In an example, each controller 50 is configured to communicate with and control at least five (5) display 10 in the system 30. In an example, each controller 50 is configured to communicate with and control at least six (6) displays 10 in the system 30. In an example, each controller 50 is configured to communicate with and control at least seven (7) displays 10 in the system 30. In an example, each controller 50 is configured to communicate with and control up to eight (8) displays 10 in the system 30. In in some examples the controller 50 is limited in the total pixel real estate that it can effectively and reliably control, e.g. In the total number of pixels 22 (and the corresponding area on the display surfaces 16 that are covered by that number of pixels 22) In al the displays 10 being controlled by that controller 50. Therefore, in some examples, the number of displays 10 that are controlled by an individual controller 50 can depend on the size of the display 10, e.g., on how many display modules 12 make up the displays 10 and how many display modules 12 are in each display 10.

The display communication link 52 can be a wired communication link, such as dedicated wiring between the controller 50 and each of the displays 10 to carry control signals from the controller 50 to each display 10, or a wireless communication link, such as signals carried over a RF transmission between telemetry devices in the controller 50 and in one or more of the displays 10. Moreover, although FIG. 3 shows the controller 50 and the displays 10 being connected together by a single display communication link 52, in other examples, there can be a separate dedicated communication link, such as a dedicated wired transmission line or a dedicated wireless channel, between each display 10 and at least one of the one or more controllers 50.

The one or more controllers 50 can also communicate with a manager 54, such as via one or more manager communication links 56. In some examples where the system 30 includes a plurality of controllers 50, each controller 50 can be in communication with and instructed by the same manager 54 via the manager communication link 56. Like the display communication link 52 between the controller 50 and the displays 10, the manager communication link 56 can be a wired link (such as a local phone system, a fiber optic network, or a wired Internet connection), or it can be a wireless link (e.g., through a cellular network, a wireless Internet connection, or a radio link), or both.

The manager 54 can provide instructions to the one or more controllers 50 via the manager communication link 56 that can then be used to control the displays 10, such as instructions that dictate what the messages 32 on each display 10 are to include. The Instructions from the manager 54 can also include instructions regarding the running of diagnostic or maintenance procedures on the one or more controller 50, on one or more of the displays 10, or on some other component of the system 30.

In an example, the manager 54 is located remotely from the system 30 such that it may also be referred to as a "remote manager 54." In some examples, a particular remote manager 54 can be in communication with and provide instructions to not just the one or more controllers 50 of the system 30, but also to controllers of one or more other display systems. In other words, the remote manager 54 can be a communication and instructional hub of a larger network of display systems.

In some examples, the one or more controllers 50 of the system 30 and the remote manager 54 can be configured to be compliant with the National Transportation Communication for ITS (Intelligent Transportation Systems] Protocol (NTCIP) standard such that the manager communication link 56 is also compliant with the NTCIP standard. In some examples, the one or more controllers 50 and at least one of the displays 10 is NTCIP compliant so that the display communication link 52 between the one or more controllers 50 and at least one of the displays 10 is also NTCIP compliant.

The example configuration of the multi-sign system 30 shown in FIG. 3 and described above (i.e., with each display 10 in the system 30 being positioned over a corresponding lane 42 of a multi-lane highway 38) was included merely to provide context for the concept of a system 30, such as a transportation information system 30, that includes multiple displays 10 located at the generally the same location. However, those of skill in the art will appreciate that other configurations of the system 30 can be contemplated, whether it be for a transportation information system 30 as shown in FIG. 3, or in another type of display system. For example, in a transportation information system 30, rather than having a dedicated display 10 over each lane 42 of a roadway 38, the system 30 might include a first display 10 at a first position relative to the roadway 38 (such as on the roadside 44 next to a first exit), and a second display 10 at a second position relative to the roadway 38 (such as on the roadside 44 next to a second exit further down the roadway 38).

Certain types of display systems 30 are used in applications where high levels of uptime are desired. For example, transportation information displays 10 like those shown in the system 30 of FIG. 3 are often operated continuously for long periods of time. The information being displayed on transportation information displays 10 is often helpful, and often necessary, to maintain efficient usage of a large transportation network (i.e., a highway system for a metropolitan area). Failure of just a single display 10 or controller 50 within an entire transportation network can lead to incorrect or incomplete communication with the intended audience (i.e., motorist using the transportation system). Moreover, as systems are expanded so that individual controllers 50 control more and more displays 10, failure of a controller 50 or the communication link 52 between the controller 50 and the displays 10 can be particular catastrophic because it can knock out a much larger number of displays 10 and be more detrimental to the intended communication to users of the transportation system. Such failure can also adversely affect public perception of the infrastructure. Moreover, the logistical cost of repairing or replacing even a small number of failed displays or controllers in large-scale systems, such as in the highway network of a large metropolitan area, is cost prohibitive.

Although the example system 30 shown and described with respect to FIG. 3 is a transportation information system 30 for displaying transportation information, those of skill in the art will appreciate that the concepts described herein can be used wherein the system 30 and the displays 10 are configured to display other types of information or content. For example, the displays 10 can be a plurality of displays in a theater box office and the system 30 and displays can be configured to display movie or show information, advertisements related to the movies or shows or the theater, or other information that the operator of the theater wishes to communicate with customers. Any system that includes a plurality of displays that an operator may wish to control can be configured using the concepts described herein with respect to the system 30.

Figure 4:
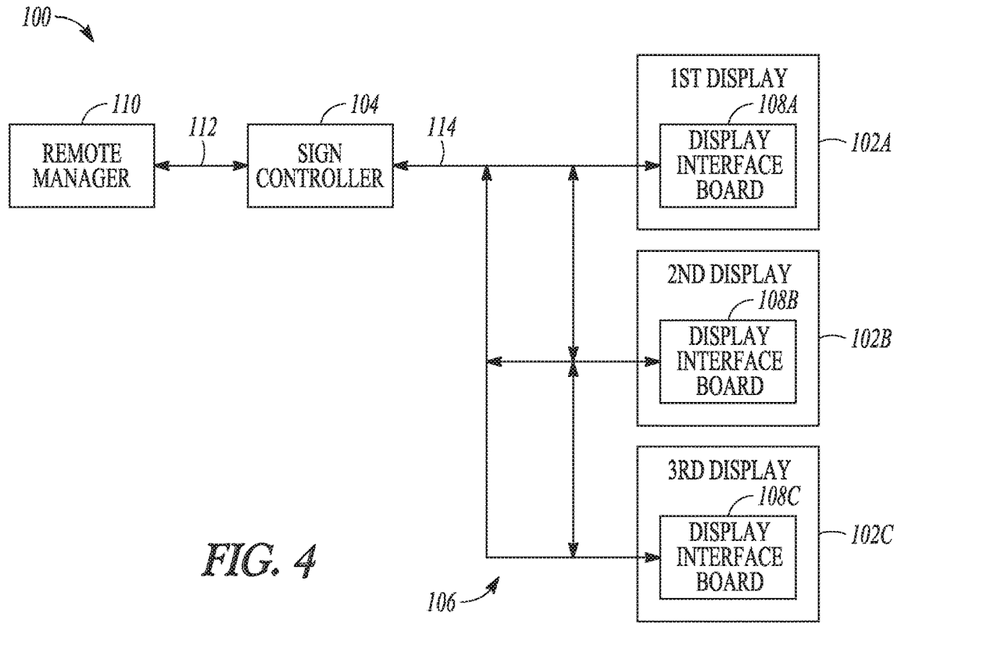
FIG. 4 is a conceptual block diagram of an example controller system for a mull-display system, such as the system of FIG. 3, with a display controller configured to control a plurality of displays.

To further demonstrate the potential problems associated with a display system with a controller that controls a plurality of displays, a block diagram of a conventional display system 100 comprising a plurality of displays 102 is shown in FIG. 4. The plurality of displays 102 in the system 100 are controlled by a single controller 104. FIG. 4 shows the system 100 as including three displays 102A, 102B, and 102C that are all controlled by the same controller 104. A display communication loop 106 is also provided for the transmission of control signals from the controller 104 to the displays 102 and in some examples for the transmission of diagnostic signals from the displays 102 to the controller 104. In an example, the display communication loop 106 comprises a fiber optic network to transmit signals between the controller 104 and the displays 102. In an example, each display 102 includes a display interface board 108 (e.g., a first display interface board 108A in the first display 102A, a second display interface board 108B in the second display 102B, and a third display interface board 108C in the third displays 102C). The display communication loop 106 can interface with the display interface boards 108 to communicate signals between the display communication loop 106 and the displays 102, and thus between the displays 102 and the controller 104. The system 100 also includes a remote manager 110 in communication with the controller 104 via a manager communication link 112, which is similar to the remote manager 54 in the transportation information system 30 of FIG. 3.

As will be appreciated by those of skill in the art, if the controller 104 in the system 100 were to fail, then it would not affect just a single display 102, but rather all three displays 102A, 102B, and 102C would also become disabled. Similarly, if there was a failure in the display communication loop 106 it could also potentially result in two or more and in some cases all three of the displays 102 depending on the severity of the display communication loop 106 failure. For example, if the link between the controller 104 and the communication loop 106 (indicated by reference number 114) were to fail, such as if the cable that forms the link 114 become severed or otherwise incapacitated before splitting into the display communication loop 106, such as at the position indicated by reference number 114, it would disable all three displays 102 in the system because none of the displays 102 would be able to receive control signals from the controller 104. Therefore, the conventional system 100 shown in FIG. 4 is vulnerable to downtime not just of the controller 104, but also for all of the displays 102 in the system 100 in certain situations. Finally, if the manager communication link 112 between the remote manager 110 and the controller 104 were to fall, then all three displays 102A, 102B, and 102C would be disabled.

Figure 5:
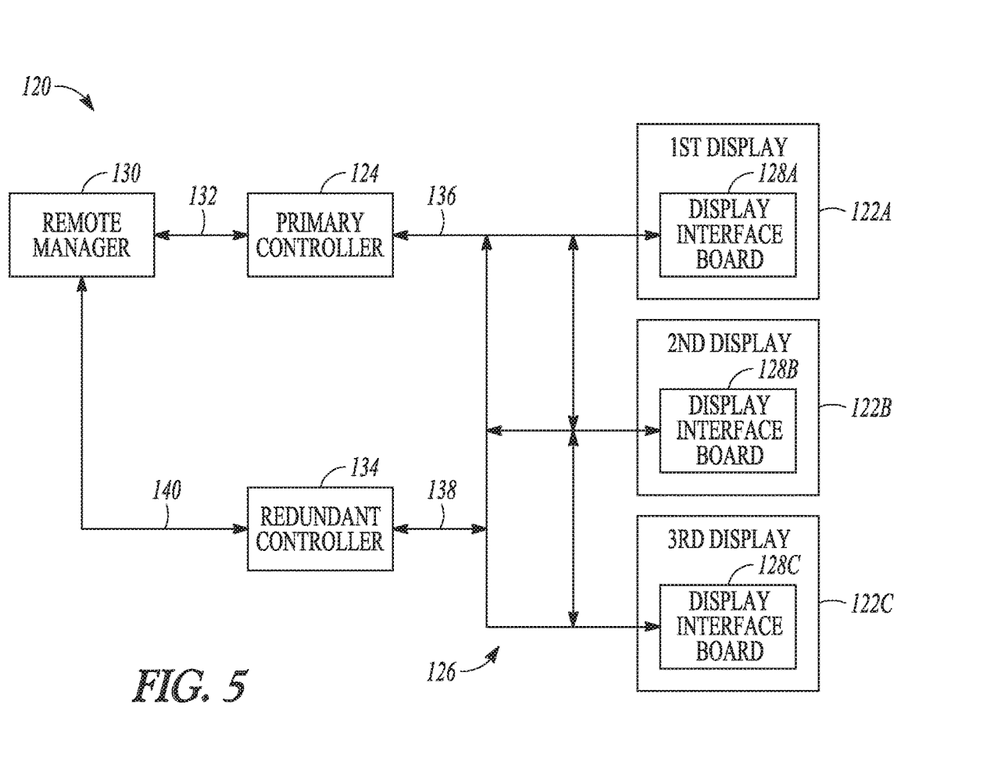
FIG. 5 is a conceptual block diagram of a first example controller setup for a multi-display system, such as the system of FIG. 3, with a primary display controller and a redundant display controller.

For these reasons, in some examples, the present description includes transportation information displays and other displays and display systems with redundancy of display controller functionality to help ensure that high uptime of the display system is achieved. FIG. 5 shows a block diagram of a display system 120 that includes an example of display controller redundancy, which will also be referred to as the redundant system 120. Like the conventional system 100 shown in FIG. 4, the redundant system 120 comprising a plurality of displays 122. Like the conventional system 100 shown in FIG. 4, the redundant system 120 in FIG. 5 also includes three displays 122 (a first display 122A, a second display 122B, and a third display 122C). In an example, the redundant system 120 can be used in a transportation information display system, similar to the system 30 described above with respect to FIG. 3, i.e., the displays 122 can be road-sign type displays similar to the signs 10 described with respect to the system 30 of FIG. 3. However, as noted above, those of skill in the art will appreciate that the concepts of the redundant system 120 are not limited to use in a transportation information system, and that they can be used in other types f display systems without varying from the scope of the present invention The displays 122 are all controllable by the same controller 124, similar to the controller 104 in the conventional system 100. The controller 124 is intended to be the main or primary controller for controlling the displays 122, and is therefore also referred to herein as the "primary controller 124." Similar to the conventional system 100, the primary controller 124 communicates with the displays 122 via a display communication loop 126 so that signals can be transmitted between the primary controller 124 and the displays 122 (i.e., control signals from the primary controller 124 to the displays 122 and optionally diagnostic signals from the displays 122 to the primary controller 124). In an example, each display 122 includes a display interface board 128 (i.e., a first, second, and third display interface boards 128A, 128B, and 128C for the displays 122A, 122B, and 122C, respectively) and the communication loop 106 interfaces with the display interface boards 128. The redundant system 120 also includes a remote manager 130 that is in communication with the primary controller 124 via a manager communication link 132, which is similar to the remote manager 110 in the conventional system 100 of FIG. 4 and the remote manager 54 in the transportation information system 30 of FIG. 3. Because the manager communication link 132 is with the primary controller 124, it will also be referred to as the "primary manager communication link 132."

The difference between the conventional system 100 shown in FIG. 4 and the redundant system 120 shown in FIG. 5 is that the redundant system 120 includes a second controller 134 that is also configured to control each of the displays 122—that is, the second controller 134 is configured to jointly control each of the first display 122A, the second display 122B, and the third display 122C. The redundant system 120 can be set up in a way that the second controller 134 can act as a backup to the primary controller 124 such that the second controller 134 can step in and take over control of the displays 122 if there is an interruption in communication from the primary controller 124 to the displays 122, such as if the primary controller 124 fails, or if the communication link 136 between the primary controller 124 and the display communication loop 126 (also referred to as the "primary link 136") or the primary manager communication link 132 fails. However, when the primary manager communication link 132, the primary controller 124, and the primary ink 136 are operating property (as is the display communication loop 126), then the second controller 124 is not necessarily needed and is superfluous. In other words, the second controller 134 adds redundancy to the operation of the system 120, and will therefore also be referred to as the "redundant controller 134."

To provide further redundancy, the system 120 includes a communication ink 138 between the redundant controller 134 and the display communication link 126 (also referred to as a redundant link 138) so that the redundant controller 134 has a path to the displays 122 that is at least partially independent from the primary controller 124 and the primary link 136. The redundant system 120 also includes a redundant manager communication link 140 from the remote manager 130 to the redundant controller 134. The redundant controller 134, redundant link 138 to the communication loop 106, and the redundant manager communication link 140 provide the display system 120 with a completely redundant set of architecture for everything between the remote manager 130 and the display communication loop 126 so that if any of the primary controller 124, the primary link 136 between the primary controller 124 and the display communication loop 126, or the primary manager communication link 132 fail, the redundant controller 134 can take over with minimal, if any, Interruption in uptime for the operation of the displays 122.

Figure 6:
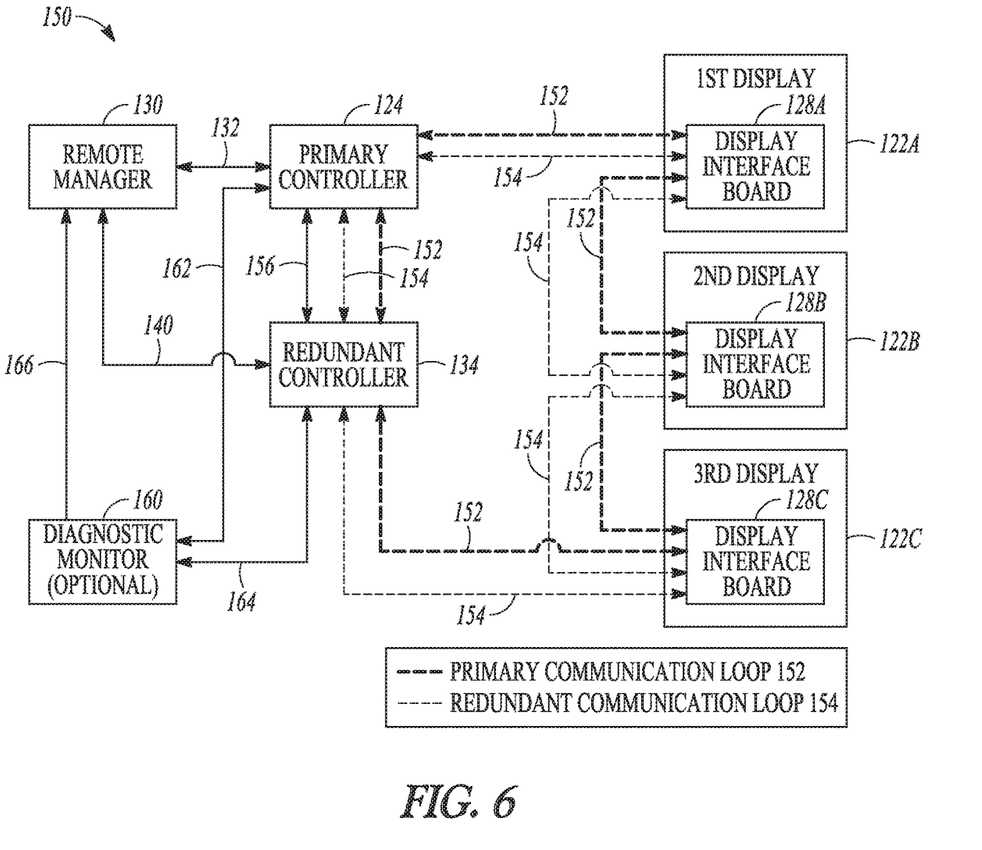
FIG. 6 is a conceptual block diagram of a second example controller setup for a multi-display system, such as the system of FIG. 3, with a primary display controller and a redundant display controller.

FIG. 6 shows a block diagram of a display system 150 that includes another example of display controller redundancy such that the system 150 will also be referred to as a redundant system 150. The controller redundancy of the redundant system 150 is similar to that of the redundant system 120 in that it includes all of the same main components: a plurality of displays 122 (i.e., the same three displays 122A, 122B, and 122C as in FIG. 5); a primary controller 124; a remote manager 130; a primary manager communication link 132 between the primary controller 124 and the remote manager 130; a redundant controller 134; and a redundant manager communication link 140 between the remote manager 130 and the redundant controller 134. For this reason, the system 150 in FIG. 6 uses the same reference numbers for these main components. Also, like the system 120, the redundant system 150 can be used in a transportation information display system, i.e., the displays 122 can be road-sign type displays similar to the signs 10 described with respect to the system 30 of FIG. 3. Those of skill in the art will appreciate, however, that the concepts of the redundant system 150 are not limited to use in a transportation information system, and that they can be used in other types of display systems without varying from the scope of the present invention The main difference between the redundant system 150 of FIG. 6 and the redundant system 120 of FIG. 5 is that in the system 150 the primary controller 124 and the redundant controller 134 do not communicate with the displays 122 via the same shared display communication loop. This is in contrast to the system 120, where both the primary controller 124 and the redundant controller 134 communicate through the same display communication loop 126. As can be seen in FIG. 6, the system 150 includes a first display controller loop 152 that is only directly accessed by the primary controller 124 to communicate with the displays 122, so that the loop 152 will be referred to as the "primary communication loop 152," and a second display communication loop 154 that is only directly accessed by the redundant controller 134 to communicate with the displays 122, so that the loop 154 will be referred to as the "redundant communication loop 154." By having the redundant controller 134 use the redundant communication loop 154 that is separate from the primary communication loop 152 used by the primary controller 124, the redundant system 150 adds an additional layer of redundancy over the redundant system 120 of FIG. 5.

In another example, the redundant system 150 in FIG. 6 can include another additional redundancy over the redundant system 120 of FIG. 5 by including an optional direct communication link that runs between the primary controller 124 and the redundant controller 134, which is also referred to herein as a communication bridge 156 between the primary controller 124 and the redundant controller 134, or simply "communication bridge 156" or "bridge 158." The bridge 158 provides an additional communication pathway between the primary controller 124 and the displays 122 that the primary controller 124 can use to communicate with the displays 122 if the primary communication loop 152 should fail while the primary controller 124 still remains functional. For example, if the primary communication loop 152 fails so that communication between the primary controller 124 and one or more of the displays 122 through the primary communication loop 152 is interrupted, then the primary controller 124 can still send control signals (and optionally receive diagnostic signals) from the pathway that runs through the bridge 156 to the redundant controller 134, through the redundant controller 134 to the redundant communication loop 154, and through the redundant communication loop 154 to the display 122 or displays 122 to which communication had been interrupted. For example, if for some reason all potential pathways from the primary controller 124 to the second display 122 through the primary communication loop 152 could not transmit control signals, then the primary controller 124 could send the control signals to the redundant controller 134 via the bridge 156, which could then relay the control signals to the second display 122B via the redundant communication loop 154. Similarly, if for some reason the redundant communication loop 154 falls and the redundant controller 134 needs to communicate with one or more of the displays 122, then the bridge 156 opens an alternate communication pathway that runs through the bridge 156 to the primary controller 124, through the primary controller 124 to the primary communication loop 152, and then through the primary communication loop 152 to the display 122 or displays 122 to which communication had been interrupted.

The bridge 156 between the primary controller 124 and the redundant controller 134 can also allow the redundant controller 134 to act as a monitor of the primary controller 124, for example so that the redundant controller 134 can act as a diagnostic monitor of the primary controller 124 during operation of the redundant system 150. The bridge 156 allows the primary controller 124 to also act as a similar diagnostic monitor that evaluates the health of the redundant controller 134.

As described above, the systems 120 and 150 described above (which can be implemented, for example, in the transportation information system 30 of FIG. 3) include hardware configurations providing redundancy for the functionality of the display controller (i.e., the controller 50 in FIG. 3 or the controller 124 in FIGS. 5 and 6) to minimize or prevent downtime of the system associated with failure of the display controller, a communication failure between the display controller and the displays, or a communication failure between the display controller and a manager that provides it with instructions (such as the remote manager 54 in FIG. 3 or the remote manager 130 in FIGS. 5 and 6). Specifically, as described above, the systems 120, 150 include one or more redundant controllers 134 in addition to a primary controller 124, as well as various combinations of redundant supporting hardware (e.g., the redundant link 138 between the redundant controller 134 and the display communication loop 126 and the redundant manager communication link 140 in both systems 120 and 15, as well as the redundant communication loop 154 and the bridge 156 between the primary controller 124 and the redundant controller 134 in the system 150).

However, in order to fully implement the redundancy protection of the redundant controller 134 and redundant supporting hardware, the system 120, 150 also preferably is configured to detect that a failure of communication between the primary controller 124 and at least one of the displays 122 has occurred, and once such a failure is detected, to switch control of the displays 122 from the primary controller 124 to the redundant controller 134.

In some examples, the logic for determining whether a failure in communication of control signals to the displays 122 has occurred is implemented in an external diagnostic monitor that is in communication with the primary controller 124 and the redundant controller 134 so that it can send and receive diagnostic signals to the primary controller 124 and the redundant controller 134 to monitor the operational heath of both controllers 124, 134. In some examples, the remote manager 130 can be programmed to also be the external diagnostic monitor (i.e., with additional software or with firmware changes to implement the functionality) so that no additional hardware is necessary (as in the system 120 of FIG. 5).

In some examples, the system 150 can be configured to monitor the controllers 124, 134 to determine which should be used to control the displays 122. In the example shown in FIG. 5, the system 150 includes a hardware-based diagnostic monitor 160. The system 150 can also include a communication link 162 between the diagnostic monitor 160 and the primary controller 124 and a communication link 164 between the diagnostic monitor 160 and the redundant controller 134 so that the diagnostic monitor 160 can send diagnostic signals and receive responses from the controllers 124, 134. The system 150 can further include another communication link 166 between the diagnostic monitor 160 and the remote manager 54 so that the diagnostic monitor 160 can be up to date on that overall status of the system 150. In some examples, both the remote manager 130 and a separate external diagnostic monitor 160 can be configured to perform the diagnostic functionality of the system.

There can also be independent diagnostic communication links (not shown) between the external diagnostic monitor (i.e., the remote manager 130, the external diagnostic monitor 160, or both) and one or more of: the primary and redundant manager communication links 132, 140; a display communication loop 126 shared by both the primary and redundant controllers 124, 134 (in FIG. 5); a primary communication loop 152 accessed only by the primary controller 124 (as in FIG. 6); a redundant communication loop 154 accessed only by the redundant controller 134 (as in FIG. 6); or with the displays 122 themselves. Each of these separated diagnostic communication links can allow the external diagnostic monitor to determine if there is a problem not just with the hardware of the controllers 124, 134 themselves, but also with the communication links in the system 120, 150 (i.e., the primary and redundant manager communication links 132, 140 and the display communication loops 126, 152, and 156) or with the hardware of the displays 122 (such as with the display interface boards 128).

The systems described herein are not limited to a hardware-based diagnostic monitor such as the diagnostic monitor 160 shown in FIG. 6. Those of skill in the art will appreciate that diagnostic capabilities can be imparted on the system in other ways, such as through one or more of: software or firmware running on one or both of the primary controller 124 and the redundant controller 134, software or firmware running on the remote manager 130, or software or firmware running on one or more of the displays 122.

The specific method that a diagnostic monitor (i.e., either the remote manager 130, one or both of the primary controller 124 and the redundant controller 134, or with a dedicated diagnostic monitor 160) uses to determine whether a failure or other problem has occurred with one of the controllers 124, 134 or with a communication link within the system 120, 150 is not important so long as the method or methods used are considered reliable within a specified range of risk that is considered acceptable to the display manufacturer or the final user of the system 120, 150.

Examples of methods that can be used to make this determination include, but are not limited to, one or more of the following methodologies:

1. The diagnostic monitor can send a regular diagnostic-check signal at least to the primary controller 124, but in some examples to both controllers 124, 134. The primary controller 124 can be configured so that when it receives the diagnostic-check signal, it is to send back a specified response that represents that the controller 124, 134 is operating properly. If the diagnostic monitor does not receive the specified response back within a specified amount of time, then the diagnostic monitor will make a determination that the primary controller 124 has failed and can send a switch-control instruction to the redundant controller 134 indicating that the redundant controller 134 should now take control of the displays 122. In examples where the remote manager 130 also acts as the diagnostic monitor, the remote manager 130 would send the diagnostic-check signal to the primary controller 124, and would receive the specified response from the primary controller 124, via the primary manager communication link 132. The remote manager 130 would send the switch-control signal to the redundant controller 134 via the redundant manager communication link 140. In examples with a separate diagnostic monitor 160, the diagnostic-check signal would be sent to the primary controller 124, and the specified response would be received from the primary controller 124, via the communication link 162, and would send the switch-control signal to the redundant controller 134 via the communication link 164.

2. As part of their normal operation, one or both of the primary controller 124 and the redundant controller 134 might be configured to send and receive diagnostic signals from the displays 122 to monitor their health, which could be similar to the methods described in the previous methodology for the diagnostic monitoring of the controllers 124, 134 by the diagnostic monitor. If the primary controller 124 or the redundant controller 134 does not receive diagnostic information from at least one of the displays 122 when it is supposed to, ether controller 124, 134 can send a signal to the diagnostic monitor indicating that the communication link between the primary controller 124 and the displays 122 is compromised. Upon receiving this signal from the primary controller 124 or the redundant controller 134, the diagnostic monitor can determine that a communication failure has occurred and send the switch-control command to the redundant controller 134.

3. The diagnostic monitor can monitor the displays 122 to confirm that they are receiving control signals from the primary controller 124 that includes video data to display (i.e., signals with data corresponding to how the LEDs 18 and the pixels 22 should be illuminated). If one or more of the displays 122 are not receiving these signals from the primary controller 124, then the diagnostic monitor can determine that a communication failure has occurred and send the switch-control command to the redundant controller 134.

4. The diagnostic monitor can routinely and regularly check with both the primary controller 124 and the redundant controller 134 and determine the status of both controllers 124, 134 with respect to one or more preselected pieces of information. The diagnostic monitor can then compare the status returned by both the primary controller 124 and the redundant controller 134 for the preselected information. If the statuses of both controllers 124, 134 match, then the diagnostic monitor can determine that the controllers 124, 134 are "in sync," which indicates that primary controller 124 is operating property. If however the status of the primary controller 124 with respect to the preselected information does not match that of the redundant controller 134, then the diagnostic monitor can determine that the controllers 124 and 134 are "out of sync." In some examples, the finding that the controllers 124 and 134 are out of sync can be sufficient for the diagnostic monitor to determine that a communication failure has occurred and send the switch-control command to the redundant controller 134. In some example, however, the diagnostic monitor may optionally further investigate to see if the out of sync finding is indicative of a failure of the primary controller 124, or if it just means the controllers 124, 134 simply need to be reset to be in sync. For example, if the preselected information used to check the synchronism is the clock time for each controller 124, 134 or the displaying schedule for the displays 122 (which is typically updated frequently by the remote manager 130) or some other information that can be cross-references, then the diagnostic monitor can simply compare the status reported by the primary controller 124 and the redundant controller 134 to what status is stored by the diagnostic monitor for the same preselected information. If the diagnostic monitor's status matches that of the primary controller 124, then the diagnostic monitor can determine that it is actually the redundant controller 134 that is having an issue and can allow the primary controller 124 to continue having control of the displays 122. If however the diagnostic monitor's status does not match that of the primary controller 124, then the diagnostic monitor can determine that a communication failure has occurred and send the switch-control command to the redundant controller 134.

The diagnostic monitor can (as described above) be able to monitor one or more other parts of the system 120, 150. For example, the diagnostic monitor may be able to communication with one or more devices that can determine if the one of the communication lines 132, 126, or 152 have a breach or some other failure that prevents the lines from property transmitting signals to and from the primary controller 124. If these one or more devices find that such a communication breach has occurred such that the primary controller 124 cannot properly communication with either the remote manager 130 via the primary manager communication link 132 or with the displays 122 via the display communication loop 126 or 152, then the diagnostic monitor can determine that a communication failure has occurred and send the switch-control command to the redundant controller 134

After control is switched from the primary controller 124 to the redundant controller 134, then, in effect, the redundant controller 134 becomes the new "primary controller." Therefore, after control is switched to the redundant controller 134, the diagnostic monitor (i.e., the remote manager 130, the separate diagnostic monitor 160, or both) can monitor the redundant controller 134 in much the same way that it did the primary controller 124 before the switch in order to confirm that there is not a communication failure between the redundant controller 134 and the displays 122. The diagnostic monitor can also continue to check on the status of the primary controller 124 after the switch of control to determine whether the communication failure between the primary controller 124 and the displays 122 has been rectified. If, at some later time, the diagnostic monitor determines that the primary controller 124 no longer has the communication issue that necessitated the switch of control to the redundant controller 134, then the diagnostic monitor can send another control-switch command to both the primary controller 124 and the redundant controller 134, which can cause the redundant controller 134 to relinquish control of the displays 122 back to the primary controller 124. Alternatively, the system can continue to operate with the controller 134 now becoming the primary controller and with the controller 124 becoming the de facto redundant controller until such time as the diagnostic monitor determines that control should be switched to the de facto redundant controller (that is, to the original primary controller 124).

In other examples, rather than having the diagnostic functionality be housed in an diagnostic monitor, the controllers 124, 134 themselves can be programmed (such as with software or firmware programming) to have the ability to monitor themselves. For example, the redundant controller 134 can be configured to act as a monitor of the primary controller 124, for example by using any of the methods described above for the diagnostic monitor (i.e., (1) the redundant controller 134 sending regular diagnostic signals to the primary controller 124, such as through the bridge 156 (FIG. 6) and then taking control of the displays 122 if the redundant controller 134 does not receive a specified response from the primary controller 124; (2) the primary controller 124 sending the redundant controller 134 a signal, such as via the bridge 156, if the primary controller 124 has not received diagnostic information from one or more of the displays 122 for a specified period of time; (3) monitoring the displays 122 and taking control if one or more of the displays have not received signals with display data for a specified period of time; (4) the redundant controller 134 can check the status of preselected information and compare it to a value stored on the redundant controller 134 or compare it with a value supplied by the remote manager 130 and if the status of the primary controller 124 is not in sync with what is stored on the redundant controller 134 or received from the remote manager 130, then the redundant controller 134 can take control). In some examples, the controllers 124, 134 themselves can have on-board programmed diagnostic capabilities in addition to an diagnostic monitor, such as the remote manager 130 or the separate diagnostic monitor 160. In some examples, the system 120, 150 can include all three methods of monitoring the controllers 124, 134, i.e., the remote manager 130 can be configured to perform diagnostic monitoring of the controllers 124, 134, and the system 120, 150 can include the separate diagnostic monitor 160, and one or both of the controllers 124, 134 can be configured to monitor the health of the other controller 124, 134.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" Is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, Inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A display system comprising:
a plurality of displays each comprising a plurality of light-emitting elements arranged in an array to display a corresponding message comprising one or more of textual, graphical, or video information;
a primary controller configured to initially control the array of light-emitting elements of each of the plurality of displays to control the content of the corresponding message of each of the plurality of displays;
a communication network between the primary controller and the plurality of displays to transmit one or more control signals from the primary controller to each of the plurality of displays;
a redundant controller configured and able to control the array of light-emitting elements of each of the plurality of displays to control the content of the corresponding message of each of the plurality of displays; and
a remote manager in communication with the primary controller and the redundant controller;
wherein the primary controller and the redundant controller are configured to:
monitor one or more of the primary controller, the communication network, one or more of the plurality of displays, and communication between the remote manager and the primary controller, and
wherein the display system provides an instruction for the redundant controller to take control of the plurality of displays when it is determined there is at least one of: a malfunction of the primary controller, a communication interruption between the primary controller and at least one of the plurality of displays, or a communication interruption between the remote manager and the primary controller.

2. The display system according to claim 1, wherein the redundant controller is in communication with the plurality of displays via the communication network, wherein the communication network transmits one or more control signals from the redundant controller to each of the plurality of displays if the redundant controller is in control of the plurality of displays.

3. The display system according to claim 1, wherein the primary controller connects to the communication network via a primary display communication link and the redundant controller connects to the communication network via a redundant display communication link.

4. The display system according to claim 1, further comprising a redundant communication network between the redundant controller and the plurality of displays to transmit one or more control signals from the redundant controller to each of the plurality of displays if the redundant controller is in control of the plurality of displays.

5. The display system according to claim 1, wherein the remote manager is configured to monitor one or more of the primary controller, the communication network, one or more of the plurality of displays, and communication between the remote manager and the primary controller,
wherein the remote manager provides a second instruction for the redundant controller to take control of the plurality of displays when it is determined there is a malfunction of the primary controller, a communication interruption between the primary controller and at least one of the plurality of displays, or a communication interruption between the remote manager and the primary controller.

6. The display system according to claim 5, wherein the primary controller controls the plurality of displays when the second determination has not been made.

7. The display system according to claim 1, further comprising a diagnostic monitor in communication with the primary controller and the redundant controller.

8. The display system according to claim 7, wherein the diagnostic monitor is configured to provide the instruction for the redundant controller to take control of the plurality of displays when the determination is made.

9. The display system according to claim 7, wherein the diagnostic monitor is configured to monitor one or more of the primary controller, the communication network, one or more of the plurality of displays, and communication between the remote manager and the primary controller and make a second determination if a malfunction of the primary controller, a communication interruption between the primary controller and at least one of the plurality of displays, or a communication interruption between the remote manager has occurred has occurred.

10. The display system according to claim 9, wherein the diagnostic monitor is configured to provide a second instruction for the redundant controller to take control of the plurality of displays when the second determination is made.

11. The display system according to claim 10, wherein the primary controller controls the plurality of displays when the second determination has not been made.

12. The display system according to claim 1, wherein the remote manager, the primary controller, and the plurality of displays are configured so that the textual, graphical, or video information of the corresponding message of each of the plurality of displays includes transportation information.

13. The display system according to claim 12, wherein one or more of: the remote manager, the primary controller, a first communication link between the remote manager and the primary controller, and a second communication link between the remote manager and the redundant controller are configured to transmit signals corresponding to the transportation information according to the National Transportation Communication for ITS (Intelligent Transportation Systems) Protocol (NTCIP) standard.

14. The display system according to claim 12, wherein the primary controller, the plurality of displays, and the communication network are configured to transmit signals corresponding to the transportation information according to the National Transportation Communication for ITS (Intelligent Transportation Systems) Protocol (NTCIP) standard.

15. The display system according to claim 14, wherein the redundant controller is in communication with the plurality of displays via the communication network, and wherein the redundant controller is configured to transmit signals corresponding to the transportation information according to the National Transportation Communication for ITS (Intelligent Transportation Systems) Protocol (NTCIP) standard.

16. The display system according to claim 14, further comprising a redundant communication network between the redundant controller and the plurality of displays to transmit one or more control signals from the redundant controller to each of the plurality of displays if the redundant controller is in control of the plurality of displays, wherein the redundant controller and the redundant communication network are configured to transmit signals corresponding to the transportation information according to the National Transportation Communication for ITS (Intelligent Transportation Systems) Protocol (NTCIP) standard.

17. The display system according to claim 1, wherein the remote manager is configured to provide the instruction for the redundant controller to take control of the plurality of displays when the determination is made.

18. The display system according to claim 1, wherein the primary controller and the redundant controller are configured to provide the instruction for the redundant controller to take control of the plurality of displays when the determination is made.

19. The display system according to claim 1, wherein the primary controller controls the plurality of displays when the determination has not been made.

\* \* \* \* \*